(12) United States Patent
Hobson et al.

(10) Patent No.: US 7,007,626 B2
(45) Date of Patent: Mar. 7, 2006

(54) AMPHIBIOUS ROBOT DEVICES

(75) Inventors: Brett W. Hobson, Carmel, CA (US);
Mathieu Kemp, Durham, NC (US);
Ryan Moody, Raleigh, NC (US);
Charles A. Pell, Durham, NC (US);
Frederick Vosburgh, Durham, NC (US)

(73) Assignee: Nekton Research LLC, Durham, NC (US)

( * ) Notice: Subject to any disclaimer, the term of this patent is extended or adjusted under 35 U.S.C. 154(b) by 0 days.

(21) Appl. No.: 11/170,562

(22) Filed: Jun. 29, 2005

(65) Prior Publication Data

US 2005/0235898 A1 Oct. 27, 2005

Related U.S. Application Data

(63) Continuation of application No. 10/848,330, filed on May 18, 2004.

(60) Provisional application No. 60/471,626, filed on May 19, 2003.

(51) Int. Cl.
*B63B 3/13* (2006.01)

(52) U.S. Cl. .................... 114/312; 114/240 R; 89/1.13; 102/402

(58) Field of Classification Search ............ 114/240 R, 114/312, 332, 337; 89/1.13; 102/402, 403
See application file for complete search history.

(56) References Cited

U.S. PATENT DOCUMENTS

| | | | |
|---|---|---|---|
| 3,215,112 A * | 11/1965 | Beck, Jr. ................. | 114/240 R |
| 6,058,847 A * | 5/2000 | Adams ........................ | 102/402 |
| 6,089,178 A | 7/2000 | Yamamoto et al. | |
| 6,213,021 B1 * | 4/2001 | Pickett ........................ | 102/402 |
| 6,250,585 B1 | 6/2001 | Pell | |
| 6,647,853 B1 | 11/2003 | Hickey | |
| 6,647,854 B1 * | 11/2003 | Stottlemyer et al. ......... | 89/1.13 |
| 6,802,237 B1 * | 10/2004 | Jones et al. ................... | 89/1.13 |

* cited by examiner

*Primary Examiner*—Lars A. Olson
(74) *Attorney, Agent, or Firm*—Myers Bigel Sibley & Sajovec, P.A.

(57) ABSTRACT

Devices for navigating in a fluid medium having a solid boundary include a vehicle body and a fin attached to the vehicle body. The fin is configured to oscillate relative to the body such that interaction between the fin and the fluid medium produces propulsive forces that propel the vehicle body in a desired direction in the fluid medium. The fin is also configured to rotate relative to the body along a transverse axis such that engagement between the fin and the solid boundary propels the vehicle body in a desired direction on the solid boundary.

19 Claims, 9 Drawing Sheets

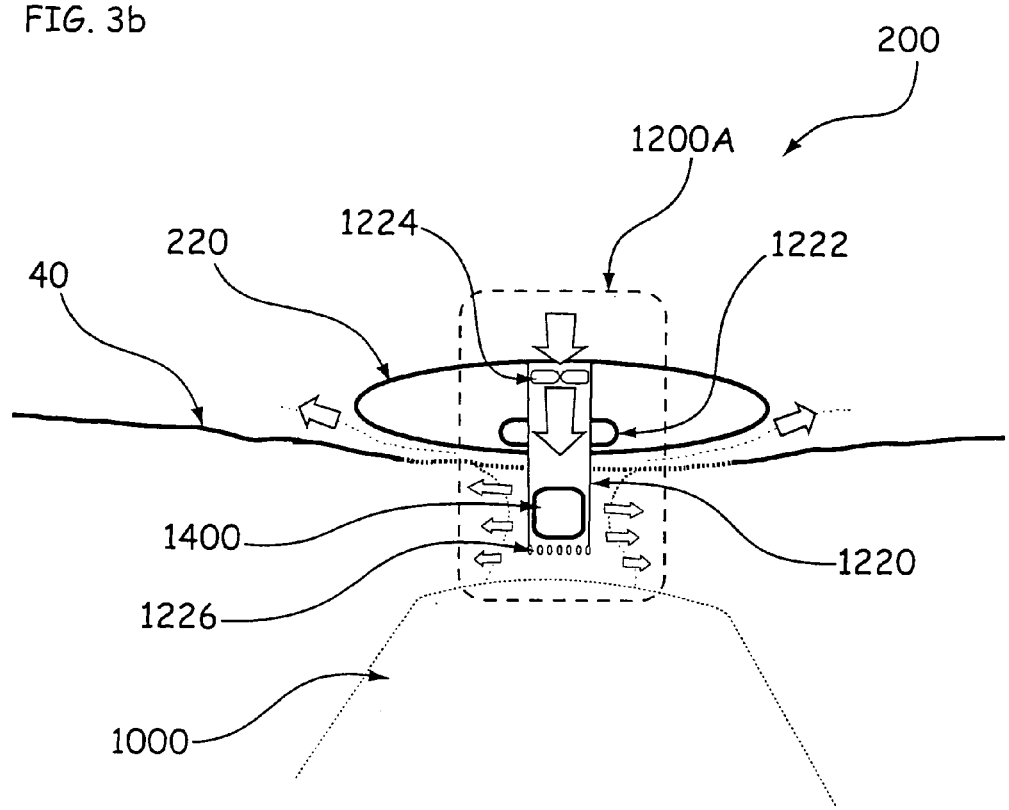

AMPHIBIOUS ROBOT DEVICES

RELATED APPLICATIONS

This application is a continuation application of U.S. patent application Ser. No. 10/848,330, filed May 18, 2004, which claims the benefit of priority from U.S. Provisional Application Ser. No. 60/471,626, filed May 19, 2003, the disclosures of which are hereby incorporated by reference in their entireties.

STATEMENT OF GOVERNMENT SUPPORT

This invention was made with Government support under Small Business Innovation Research (SBIR) Program Contract Nos. N00014-00-C-0445, N00014-02-M-0209, and N00014-05-C-0277 awarded by The United States Navy. The Government has certain rights in the invention.

FIELD OF THE INVENTION

This invention relates generally to methods and devices for robot devices, and more specifically, to amphibious robot devices.

BACKGROUND OF THE INVENTION

Accurate and timely information can be crucial to success in military operations, but in some circumstances, information can be gained only at considerable risk to personnel. In recent times, remote sensing has assumed certain intelligence gathering tasks. Not all desirable information is, however, accessible via remote sensing, and personnel continue to be in harm's way. One example is personnel swimming ashore and moving inland through hostile territory to gather timely information on enemy strengths and positions, which can expose the personnel to situations with the enemy, such as capture and attack. Another example is the placing of neutralization charges on submerged mines, which often can be at least partly covered with sediment and, therefore, difficult to neutralize. Thus, devices that reliably replace human operatives in gathering information or neutralizing mines may be desirable.

In the case of underwater mines, sediment covering a mine can shield it against efforts by divers or dolphins to place an explosive charge in close proximity to neutralize the mine. As a result, a large unwieldy neutralizing charge is typically carried and placed by hand over a buried mine. Despite such close placement, a sediment-covered mine may not be effectively neutralized because of the shielding effect of the overlying sediment. These techniques expose divers and/or dolphins used for this task to considerable risk.

Navigation can pose a challenge in an underwater environment, especially when land use is also desired, such as in intelligence gathering. Swimming, ambulating and/or digging impose different design constraints on a device. Designs for amphibious activity by a machine, therefore, necessarily reflect compromises. The study of biological mechanics reveals that designs for swimming in fish and in aquatic mammals have independently converged on fins, with some fish and animals also using their fins to dig or to move about on land. Terrestrial animals, such as frogs or otters, which operate secondarily in water, retain leg morphology suited to terrestrial locomotion and use webbed feet for enhanced swimming. In either machine or animal, current morphology can be seen to reflect design for the primary or first inhabited environment as well as the balance of time spent in water vs. on land.

Considerable effort has been devoted to developing robots that can operate autonomously on land. Some proposed terrestrial robots use legs with numerous degrees of freedom that require considerable sensing and computation to control their use, making movement slow and costly. Others propose extending compliant legs with low degrees of freedom to contact the substratum. Still others propose a stiff propelling component resembling and operating like a wheel rim portion supported by one or more spokes. Proposed leg and wheel-resembling appendages are inefficient for swimming. Such designs may not be well-suited for movement in water or other fluid environments.

SUMMARY OF THE INVENTION

According to embodiments of the present invention, devices for navigating in a fluid medium having a solid boundary include a vehicle body and a fin attached to the vehicle body. The fin is configured to oscillate relative to the body such that interaction between the fin and the fluid medium produces propulsive forces that propel the vehicle body in a desired direction in the fluid medium. The fin is also configured to rotate relative to the body along a transverse axis such that engagement between the fin and the solid boundary propels the vehicle body in a desired direction on the solid boundary. In this configuration, the device can move in both a fluid medium, such as water, and on land. The device can be equipped with sensors to gather information, and can be used, for example, in a military intelligence operation to gather information without endangering personnel.

According to further embodiments of the present invention, methods of navigating a device in a fluid medium having a solid boundary include releasing the device to the fluid medium. The device includes a vehicle body, a fin attached to the vehicle body, and a controller for controlling and/or driving the fin. The fin can be moved with the controller such that interaction between the fin and the fluid medium produces propulsive forces that propel the vehicle body in a desired direction in the fluid medium. The device can be propelled to a solid boundary of the fluid medium. The fin can be moved with the controller such that engagement between the fin and the solid boundary propels the vehicle body in a desired direction on the solid boundary to a predetermined location.

In some embodiments, a device for navigating in a fluid medium having a solid boundary includes a vehicle body and a fin attached to the vehicle body. The fin includes a flexible portion having an elongated shaft therein, and a rigid tine coupled to the shaft, wherein the flexible portion is movable from a first position adjacent the tine and a second position extended away from the tine such that the tine is exposed. The fins can be used to move sediment, for example, to expose a mine or other object, and/or to bury the device to reduce the chance of detection. For example, the fin can be configured to propel the device through water when the flexible portion is in the first position. The tines may be configured to engage and move portions of the solid boundary when the flexible portion is in the second position extending away from the flexible portion.

In still further embodiments according to the present invention, a device for neutralizing a mine at least partly covered with sediment in a fluid medium includes a body and a sediment displacing unit attached to the body. The sediment displacing unit is configured to interact with the fluid medium and/or the sediment to displace the sediment covering the mine. A neutralizing unit is attached to the body and configured to neutralize a mine.

In particular embodiments, the sediment displacing unit is configured to fluidize the sediment, for example, so that the neutralizing unit may be extended through the sediment and closer to a mine.

BRIEF DESCRIPTION OF THE FIGURES

FIG. 3b is a side view of a device without fins and having a sediment displacement unit according to embodiments of the present invention;

DETAILED DESCRIPTION OF EMBODIMENTS OF THE INVENTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, layers, components, or features may be exaggerated for clarity.

Figure 1A:
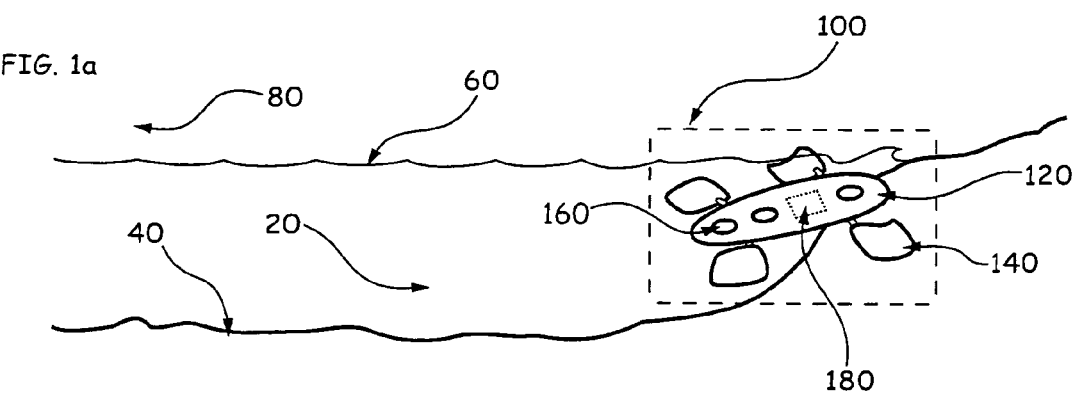
FIG. 1a is a perspective view of a device according to embodiments of the invention having a fin and shown in an aquatic environment.

FIG. 1a illustrates a device 100 according to embodiments of the present invention that includes a body 120, fins 140, and transducer(s) 160. As shown, the device 100 includes a payload 180 that can be carried within or attached to the body 120, for example, to neutralize another object. The device 100 can swim in the water 20, such as at an intermediate depth, near the substratum 40, and/or at the surface 60. The substratum 40 can be a solid boundary of either air 80 or water 20, such as the sea bottom, sediment, ground, beach, river bank, swamp, obstacles, man-made objects or surfaces, organic matter, debris, or other material that is not both finely divided and suspended in a gas or liquid. The device 100 can crawl along the substratum 40 in the water 20 or on land. "Land" can include any environment not characterized as a swamp or water environment.

The device 100 can operate in still or moving water 20, or on a level, inclined or uneven substratum 40. As used herein, crawling is any form of locomotion involving contact with the substratum 40. The device 100 may be small enough to be carried by one person, although larger sizes can be used. In certain embodiments, the device 100 can operate autonomously. Alternatively, the device 100 can be controlled by an operator.

Figure 1B:
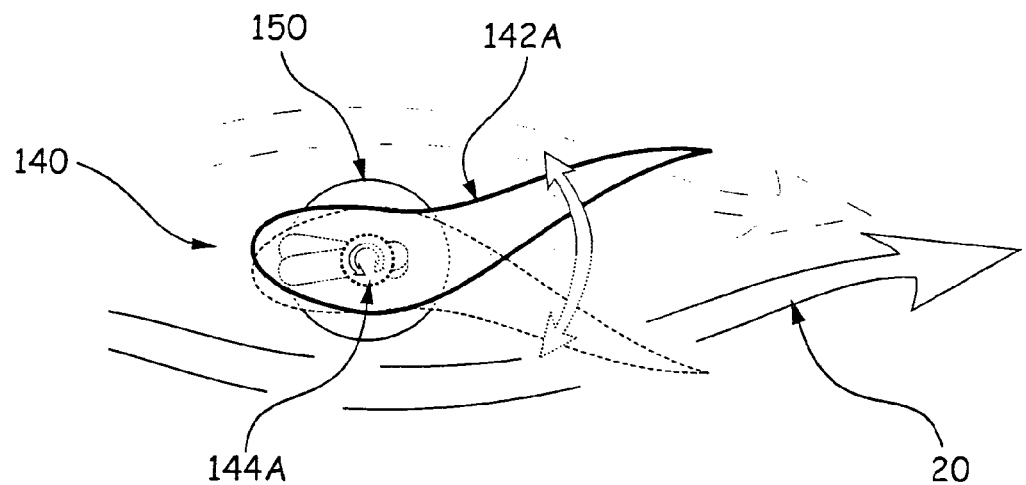
FIG. 1b is a fin from the device of FIG. 1a illustrating oscillating movement used for swimming.
Figure 1C:
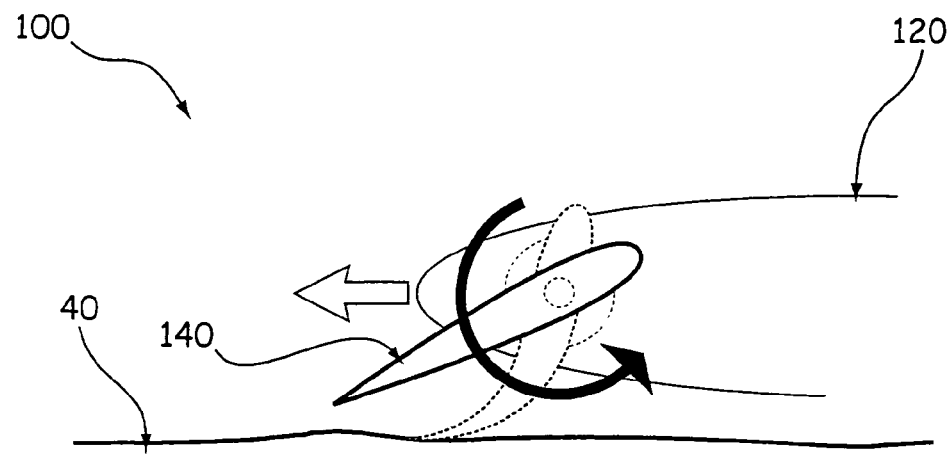
FIG. 1c is a fin from the device of FIG. 1a illustrating rotational movement used for ambulating.
Figure 1D:
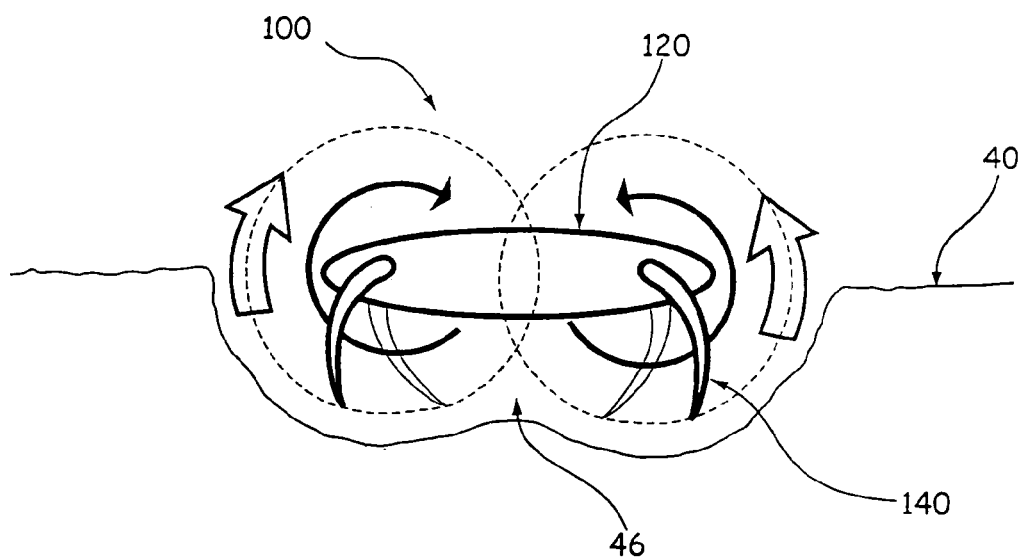
FIG. 1d is the device of FIG. 1a illustrating rotational movement of the fin used for digging.

The fins 140 can be configured to move the device 100 through the water 20 or on the stratum 40. As illustrated in FIGS. 1b–d, the fins 140 can be used in various ways, including to swim, ambulate, turn, flip over, and dig. As illustrated in FIG. 1b, during swimming, the fins 140 may oscillate to produce undulations resembling those of a swimming fish. Interactions between the fin 140 and the water 20 produce propulsive forces that propel the body 120 in a desired direction in the water. Specifically in swimming, the fins 140 can be oscillated in coordinated fashion, such as with oscillations having essentially the same average angular velocities and excursions to produce constant velocity swimming. Turning may be accomplished by varying the angular velocity or excursion of at least one fin 140 with respect to the other fins 140.

As used herein, "oscillation" refers to a back and forth movement between two positions, such as shown is in FIG. 1b. Oscillations can include movement between two changing positions, for example, such that the magnitude of the oscillation may change. In contrast, "rotational" movement or "rotating" refers to a turning motion in a direction around a center or an axis, as is illustrated in FIG. 1c. Rotational motion can be continuous around 360° about a center or an axis. With reference to FIG. 1c, during ambulation (which can include crawling, walking, trotting, climbing, and running), the fins 140 preferably are rotated about the axis of the shaft such that engagement between the fin and the solid boundary propels the body 120 in a desired direction along a solid boundary, such as the stratum 40. For straight line ambulation, the rotation rates of the fins 140 are preferably more or less equivalent. For turning during ambulation, the rotation rate of at least one fin 140 can be changed relative to the rotation rate of the other fins 140.

As illustrated in FIG. 1d, the fins 140 can be used for digging, such that the rotation and/or oscillations of pairs of fins 140 having opposite angular senses, or counter-rotations or oscillations can be used. Counter-rotation may produce at least partly opposed traction vectors, the net result of which is to reduce the net force tending to move the device away from the desired location of digging. Digging fins 140 can be iso-lateral, contra-lateral or diagonally contra-lateral. In one example of digging, one iso-lateral fin is rotated clockwise and one is rotated counterclockwise, with phase of their rotations such that the fins 140 do not interfere with each other.

With reference to FIG. 1a, operations of the device 100 can be aided by the transducer 180, for example, to navigate the device 100. As used herein, a "transducer" is a device than can send and/or receive a signal, including active or passive devices. Signals can include acoustic, optical, chemical, electrical, magnetic, electromagnetic, vibratory, force, torque, inertia, motion, and/or biological signals. In certain embodiments, the transducer 160 can be used for more than one function. For example, a temperature sensor can sense environmental temperature and enable navigation toward a source of heat, or a communications module can receive messages and indicate direction for navigation purposes. As another example, the transducer 160 can be used to detect, classify, identify or measure signals and/or objects.

The transducer 160 can also be used to orient the device 100 or communicate with other devices and/or electrical equipment.

Figure 2A:
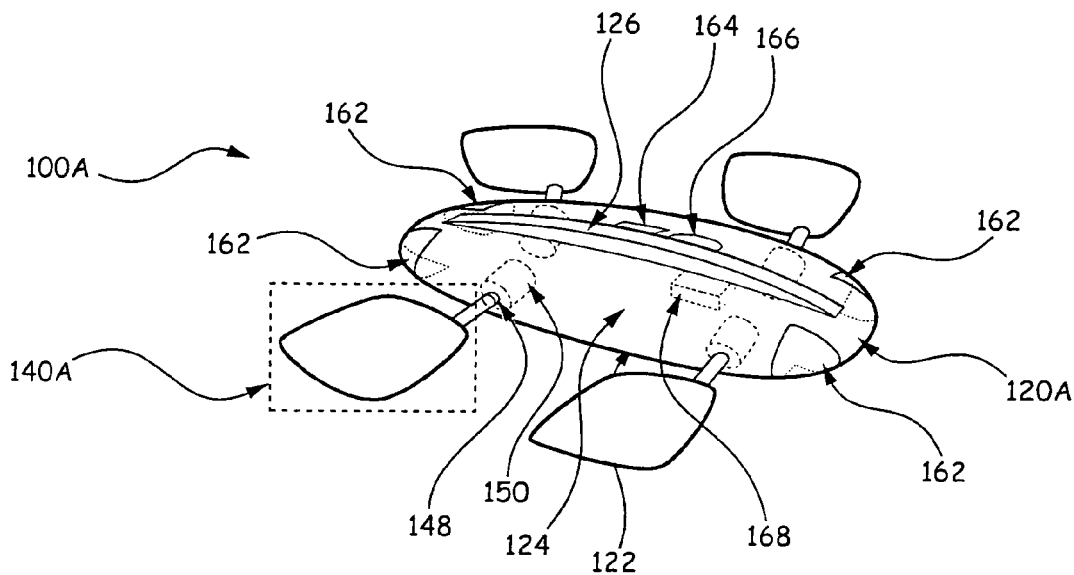
FIG. 2a is a perspective view of a device according to further embodiments of the invention.

FIG. 2a illustrates a device 100A having a body 120A with a ventral surface 122 and a dorsal surface 124. The body 120A is preferably lozenge-shaped, e.g., somewhat dorso-ventrally compressed, although other shapes can be used. The body 120A has four fins 140A; however, the body 120A can include between 2 and about 32 or more fins. The fins 140A are preferably placed symmetrically about the body 120A, although other placements can be used. The body 120A can include one or more skegs 126 on either the ventral surface 122 or the dorsal surface 124. The skeg 126 can be any feature of the body 120A in the form of a keel, ridge, runner, wedge, hump, finger, or other protuberance having sufficient mechanical strength to support a portion of the weight of the device 100A, for example, in water 20 or in air 80 as shown in FIG. 1. The fins 140A are driven by a motor 150. The motor 150 is controlled by a controller 148, which can be included as a component of the motor 150, the fin 140A, or a computer module 168. In certain embodiments, the controller 148 can detect or control, for example, fin angular position, fin angular velocity, and fin-generated torque with respect to the motor 150 or body 120A, as well as parameters derived from such detected variables, such as the acceleration of a fin 140A.

A plurality of transducers is shown in FIG. 2a, including an environmental sensor 162, a navigation sensor 164, and a communication module 166. The ventral surface 122 and dorsal surface 124 of the body 120A preferably have sensors (not shown) that may be similar to the environmental sensor 162, the navigation sensor 164, and/or the communication module 166 to permit operation of the device 100A with either side of the device 100A facing upward. The environmental sensor 162, the navigation sensor 164, the communication module 166 and/or other transducers may be placed in various locations on the body 120A.

The environmental sensor 162 can be an oceanographic sensor, an air sensor, a depth sensor, a temperature sensor, a light sensor, an accelerometer, a surge sensor, a gravitational sensor, an orientation sensor, an obstacle detector, a velocity sensor, and/or a direction finder. The navigation sensor 164 can include a sonar device, a compass, an inertial navigation module, a direction finder, and/or a geo-locating device. The operations of the sonar device can include obstacle avoidance, side scan, forward sector, imaging, mapping, ultrasonic, array, Doppler velocity, and altimeter sonar. The communications module 166 can be a sonar, ultrasonic, optical, electrical, acoustic, radio, electromagnetic, fiber-optic, and/or tether module.

Figure 2B:
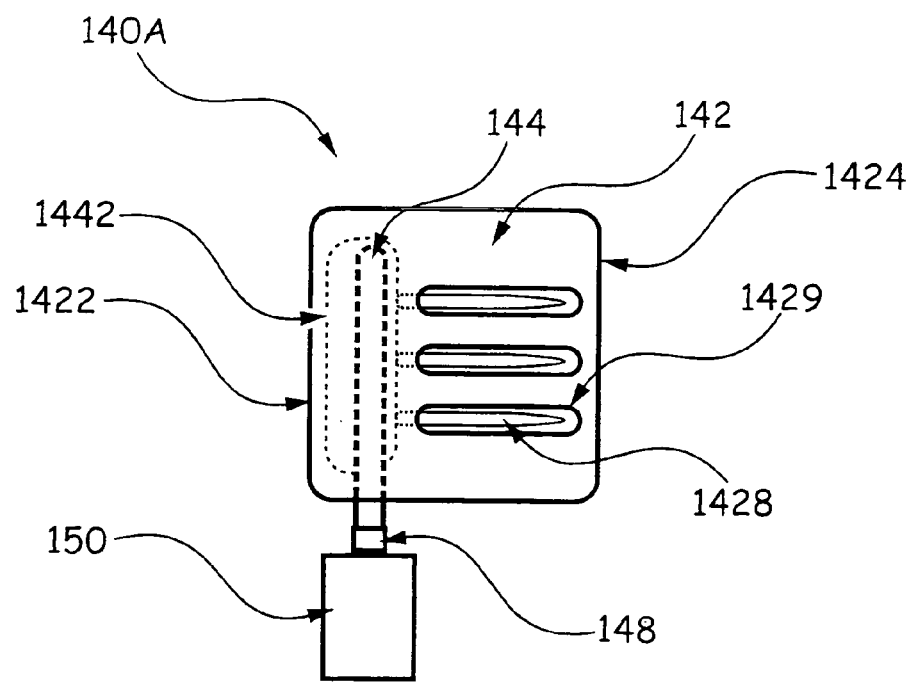
FIG. 2b is a profile view of a fin having a tine according to further embodiments of the invention.

Referring to FIG. 2b, the fin 140A can further include at least one tine 1428 attached to a shaft 1429 that can be used to disrupt the substratum, such as during digging: The fin 140A includes a vane 142 and a drive shaft 144. As illustrated, the shaft 1429 is an opening that can extend through the entire vane 142 or through a portion of the vane 142 to hold the tine 1428 therein. The vane 142 can be formed of a compliant elastic material such as an elastomer, although other materials including plastics, metals, or biomaterials can be used. In certain embodiments, the drive shaft 144 can further comprise at least one mechanical feature 1442 such as a blade, paddle, pin, recess, slot, or other mechanical feature 1442 providing enhanced coupling between the vane 142 and the shaft 144.

The geometry of the vane 142 can include an edge having a leading edge 1422 and a trailing edge 1424. The profile of the fin 140A shown in FIG. 2b can have various shapes including, rectangular, paddle-form, tapered, streamlined, tear-drop, trapezoidal, and curvilinear. In certain embodiments, the leading 1422 or trailing 1424 edge can be generally parallel to the shaft 144, although such orientation is not a requirement. The shaft 144 can be positioned nearer the leading edge 1422 than the trailing edge 1424. The leading edge 1422 can be thicker than the trailing edge 1424, and the vane 142 can taper more or less gradually towards the trailing edge 1424.

Figure 2C:
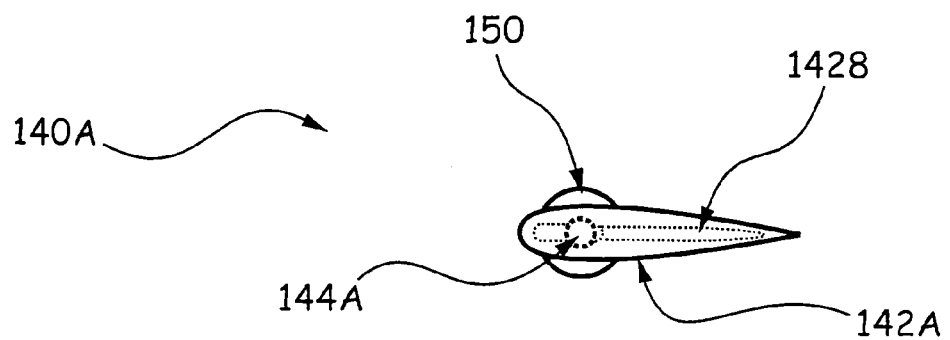
FIG. 2c is a side view of the fin of FIG. 2b with the tine inside the shaft.
Figure 2D:
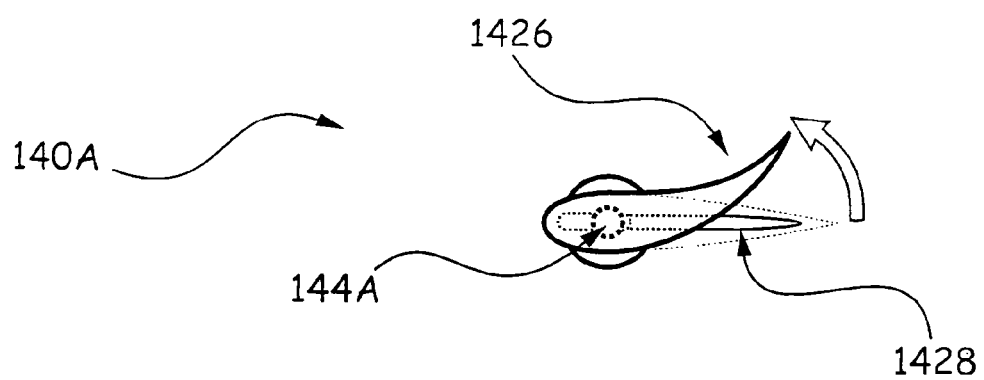
FIG. 2d is a side view of the fin of FIG. 2b with the tine exposed outside the shaft.

With reference to FIGS. 2c–2d, the tine 1428 can be formed of a variety of materials, including metal, plastic, composite, or reinforced composite type. The tine 1428 can be moved between a position against the vane 142A (FIG. 2c) and a deflected position 1426 that exposes the tine 1428 (FIG. 2d). The tine 1428 can be more or less rigidly coupled to the shaft 144A so that rotation of the fin 140 (which can cause the deflection in position 1426 by retarding the trailing edge 1424) can expose the tine 1428. The tine 1428 can contact a solid material to loosen material for removal by the fin 140A or currents, including those currents caused by the fin 140A. In certain embodiments, the vane 142A includes a slot 1429; however, other sequestering features can be used to at least partly sequester the tine 1428 when the fin 140A is substantially non-deformed. Examples of other types of sequestering features include slots, pickets, cavities, niches or recesses. Examples of fins that can be used for fins 140A include fins described in U.S. Pat. Nos. 6,179,683 and/or 6,250,585. U.S. Pat. Nos. 6,179,683 and 6,250,585 discuss compliant fins and their use for generation of swimming thrust for aquatic locomotion. U.S. Pat. Nos. 6,179,683 and 6,250,585 are hereby incorporated by reference in their entirety.

In certain embodiments, the fin 140A can be driven by a motor 150 to cause oscillation, rotation, or orienting of the fin 140A. The orientation of the fin 140 can be used to provide a control-surface or a lift-surface function. Rotation and oscillation of the fin 140 can be used to generate force or torque for locomotion, digging, "station keeping", and related functions. "Station keeping" refers to the action of maintaining the device 100 in a desired location, position, and/or orientation.

Figure 3A:
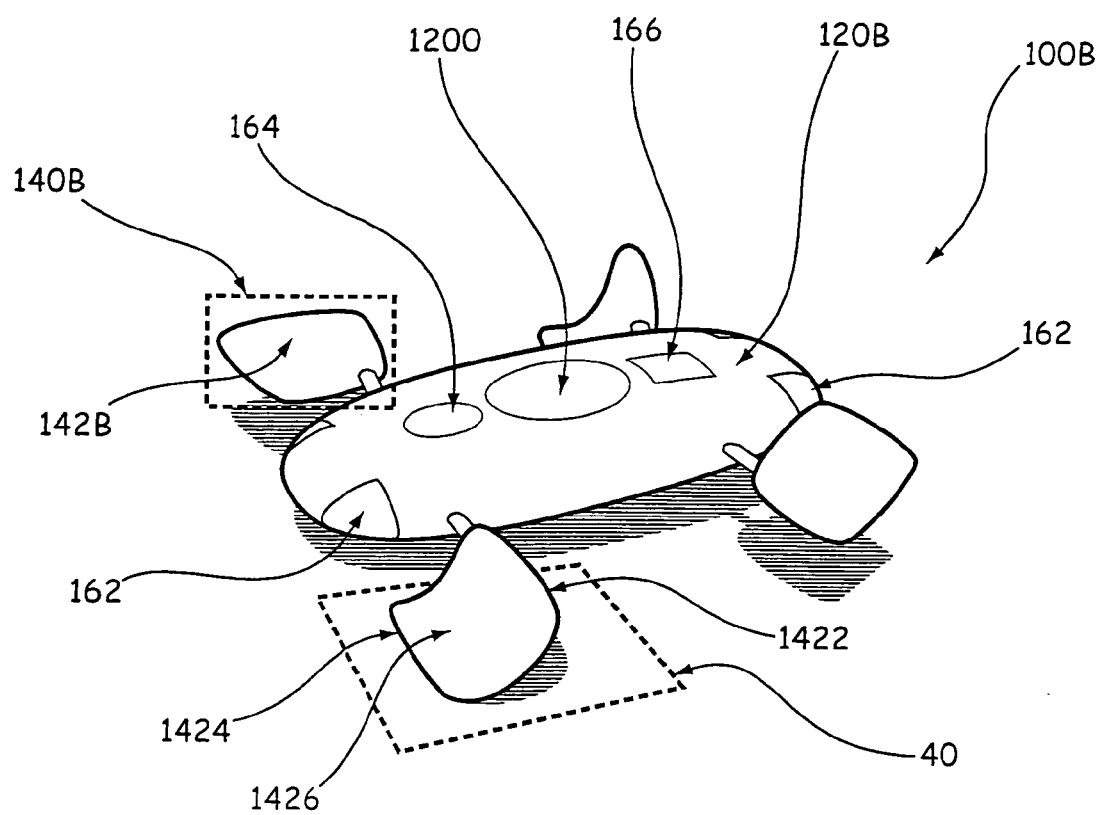
FIG. 3a is a perspective view of a device having a sediment displacement unit according to further embodiments of the invention.

FIG. 3a illustrates the device 100B crawling on the substratum 40. In a preferred embodiment, the body 120B is propelled by rotation of fins 140B to contact and exert force against the substratum 40. In certain embodiments, crawling can be enhanced by energy transfer from the fin 140B to water 20 or air 80 as shown in FIG. 1. In certain embodiments, the fin 140B can act as a passive feedback control device. For example, the fin 140B can function as a shock absorber when rotation causes increased loading from traction with the substratum 40. As shown, the compliant vane 142B of the fin 140B has a curved deformation 1426. The deformation 1426 of the compliant vane 142B can provide shock-absorbing functions mediated by a controller (not shown).

The device 100B can include a sediment displacing unit 1200, such as a propeller, pump, or other water moving component that can generate water current to displace sediment.

A sediment displacing unit according to embodiments of the present invention can also be used in other devices that do not employ fins. For example, a device 200 with a displacing unit 1200A and without fins is illustrated in FIG. 3b. The device 200 can include an explosive charge 1400 or sensor or other desirably positioned device. The explosive charge 1400 can be an explosive of any type, including bulk, directed and shaped explosives, that can be mounted in the body 220 or the sediment displacing unit 1200A.

The sediment displacing unit 1200A can be any type of component that can displace sediment. As illustrated in FIG. 3b, the sediment displacing unit 1200A includes a tube 1220 that can be extended by an extending mechanism 1222. In some embodiments, the extending mechanism can be omitted and gravity may be sufficient to extend the tube 1220. The tube 1220 can include a displacement assisting water pump of any type, illustrated here by a current producing propeller 1224 and a current outlet 1226 that can direct water currents with respect to the substratum 40. In certain embodiments, the charge 1400 can be mounted with respect to the outlet 1226. The sediment displacing unit 1200A can also be mounted at various locations and orientations with respect to the body 220 and used to propel the device 200 through water.

The sediment displacing unit 1200A can be used to fluidize stratum 40. For example, the sediment displacing unit 1200A can fluidize a portion of the stratum 40 below the device 200. "Fluidizing" refers to a process in which water is injected into the stratum 40 to separate and facilitate movement of sediment components with respect to each other. The fluidized sediment components in the stratum 40 can then be displaced by water currents generated by the propeller 1224 or by a mechanical force, such as by the extension of the duct 1220. The stratum 40 can be fluidized without removing large portions of sediment. Once the stratum 40 has been fluidized, an object, such as an explosive charge to destroy a mine, can be pushed with relative ease through the stratum 40.

Figure 4A:
FIGS. 4a–4b are side views of the device of FIG. 3a illustrating various operations according to embodiments of the invention.
Figure 4B:
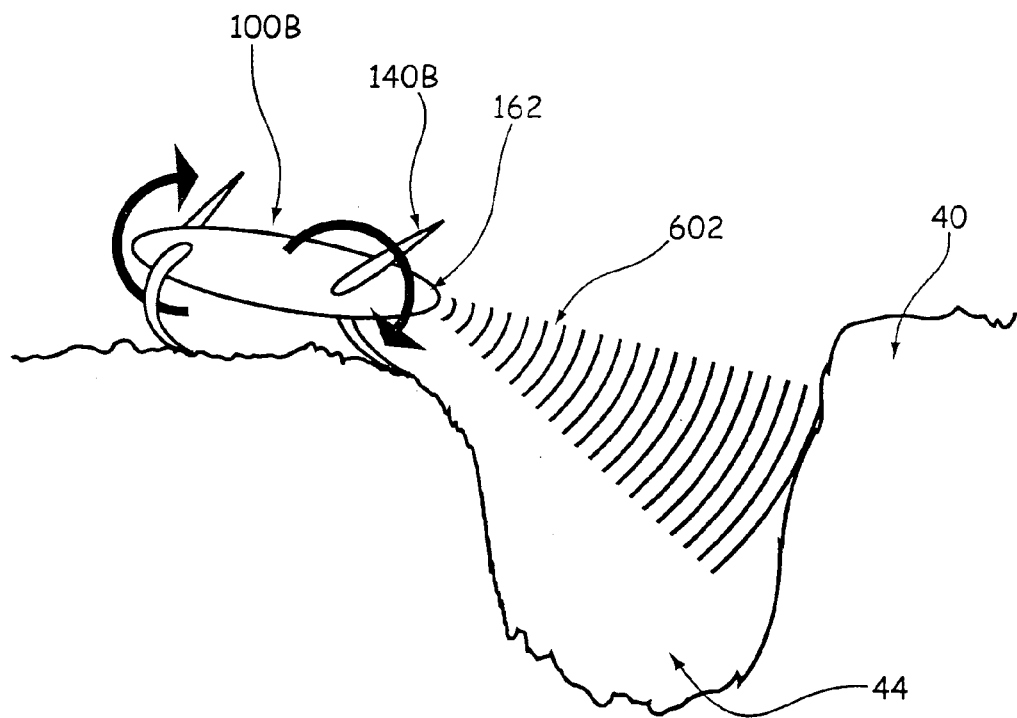

FIG. 4a illustrates the device 100B of FIG. 3a crawling over an obstacle 42 during which the fin 140B rotates into contact with the obstacle 42 and continues to rotate, thereby propelling the device 100B over the obstacle 42. Obstacles can occur in water or on land. In water, an obstacle 42 can be at least partly buried, or exposed on the substratum 40 or at any depth in water. Examples of obstacles in water can include a log, a ship, a man-made object, flotsam, debris, aquatic infrastructure, geologic structure, or an animal. FIG. 4b illustrates the device 100B detecting a fall hazard 44. The fall hazard 44 can be any topographic change in the substratum 40, such as a hole or cliff into which transit of the device 100B can cause undesirable over-turning or retaining of the device 100B. In certain embodiments, an obstacle 42 or fall hazard 44 can be detected by a environmental sensor 162, preferably one emitting an interrogating signal 602, although a passive-type transducer can also be used. In certain embodiments, an environmental sensor 162 can be used to determine a path to avoid the obstacle 42 in FIG. 4a or the fall hazard 44 in FIG. 4b, or to resume crawling or swimming in a desired direction or toward a desired destination. Avoiding an obstacle 42 can occur in water or on land.

Figure 5A:
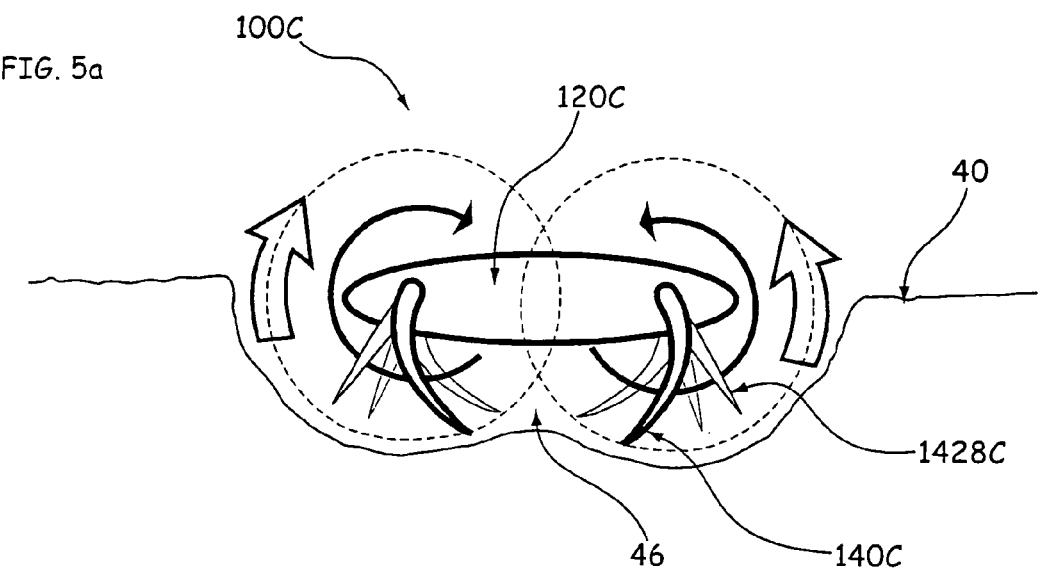
FIGS. 5a–5b are side views of a device according to embodiments of the present invention illustrating digging operations.
Figure 5B:
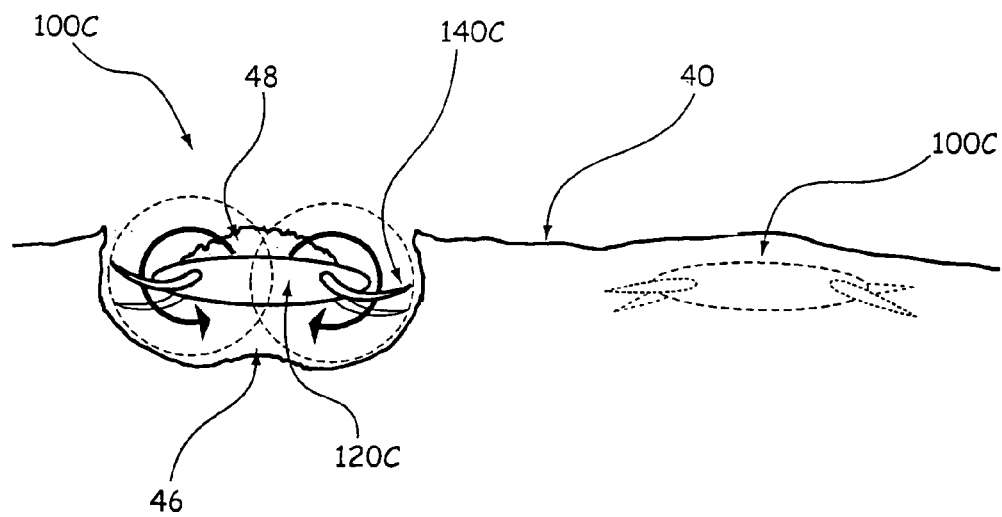

FIG. 5a illustrates a device 100C employing fins 140C and tines 1428C to dig a depression 46 in the substratum 40. The depression 46 can be the result of any depth or extent of stratum 40 moved or removed by the device 100C. As shown in FIG. 5b, the stratum 40 can further produce an accumulation of the material 48 from the depression 46.

FIG. 5b illustrates self-burial by the device 100C, such that the material 48 removed from the substratum 40 can be deposited as an accumulation of material 48 on the device 100C, for example, using the fin 140C. In certain embodiments, the device 100C can partly or completely bury itself. In certain embodiments, the device 100C can subsequently crawl from the depression 46 and/or the device 100C can remove the accumulation of material 48. Example of methods for removing the material 48 include exposing the material 48 to environmental currents, moving to induce currents, or tilting the body 120C.

Figure 6:
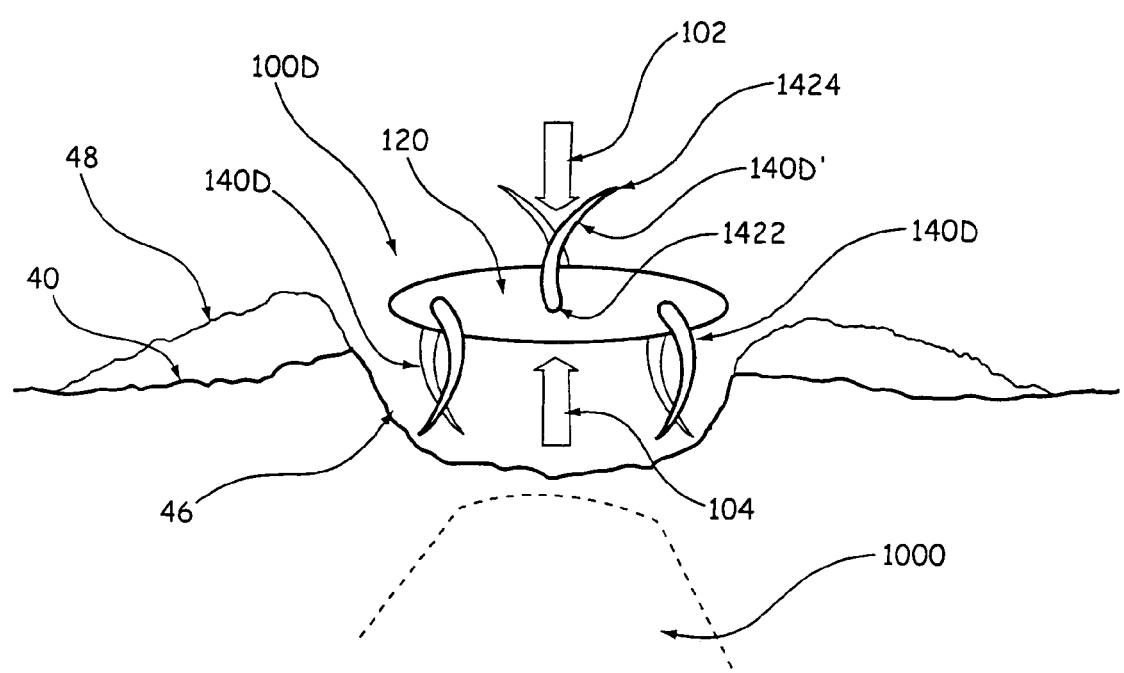
FIG. 6 is a side view of a device according to further embodiments of the present invention.

FIG. 6 illustrates the device 100D being used to dig near a buried object 1000, such as a sea mine. The illustrated embodiment of the device 100D has six fins 140D and 140D'. In order to be used for digging, the fins 140D and 140D' can be oscillated, although rotating, static or quasi-static orientation of the fins 140D and 140D' can also be used. As illustrated, four generally vertically oriented fins 140D having a trailing edge directed towards the substratum 40 are oscillated to dig a depression 46. Digging the depression 46 can generate an upward force 104. Two generally vertically oriented fins 140D' having a trailing edge directed away from the substratum 40 are oscillated to generate a downward force 102 to oppose, at least partly, any upward force 104 generated during digging. The downward directed force 102 can provide station keeping capabilities, holding the device 100D against or proximate to the substratum 40 or depression 46. Any number or combination of fins 140D and 140D' can be used for digging or station keeping, although optimal selection and activity coordination are desirable. In certain embodiments, individual fins or sets of fins, such as fins 140D and 140D', can be used changeably by rotating, oscillating, orienting and by other methods depending on the intended use. In certain embodiments, rotation can be at a constant or varying angular velocity. For example, rotation can be slow to enable a fin to gather material and then accelerated to fling the gathered material from the fin, such as is similar to the motion of a shovel used for digging.

Devices according to embodiments of the present invention have various uses in water or on land. For example, devices described herein can be used to monitor and/or gather information by techniques or methods compatible with the device. For example, the device can include a monitoring device such as a still or video camera, an audio recorder, a chemical sensor, an electromagnetic sensor, a temperature sensor, a salinity detector, a fluorescence sensor, and optical sensor, an infrared sensor, a vibration sensor, a radio receiver, a radar device, or a global positioning unit for gathering information. Examples of gathering information can include environmental sensing of water 20, substratum 40, and air 80 (shown in FIG. 1). The information can be recorded and/or analyzed. Information can be gathered by transmitting signals, including visual, acoustic, and electromagnetic signals. Information gathering can be used for various purposes including environmental monitoring, oceanographic profiling, or intelligence gathering. Information gathering can be conducted autonomously, adaptively, or under operator control. Information gathering can be conducted in areas where it is desirable for a device to operate autonomously. For example, embodiments of the invention can provide clandestine gathering of intelligence on military forces and assets in hostile or denied areas.

Devices according to embodiments of the present invention can be used to "neutralize" or render another device or material inoperable or less useful. For example, an explosive charge can be detonated, a liquid released, or an electromagnetic signal generated that renders an object less useful, for example, to a opposing combatant. The devices according to embodiments of the present invention can be used to neutralize other objects such as a vehicle, ordnance, explosive device, mechanical device, electronic device, or supplies. An object can be neutralized using various techniques. For example, a neutralized object can be at least partly buried, exposed on the substratum, or exposed at some depth in water. Neutralizing can include digging to permit closer approach to an object. Vehicles that can be neutralized include aquatic, terrestrial, and aerial vehicles. Electronic devices that can be neutralized include information gathering devices, signal detecting devices, or signal emitting devices. Examples of explosive devices that can be used to neutralize an object include mines, bombs, explosive projectiles, rockets, or any dangerous device that can be used by military or paramilitary forces. Mechanical devices that can be neutralized include infrastructure, equipment, or supplies, such as an individual unit or cache of any material, such as devices, components, ammunition, information, food, or potable water that is desirably rendered less useful to others. Neutralizing can be conducted by various techniques to damage, destroy, explode, chemically treat, electrically treat, or magnetically treat an object. An object can be chemically treated by the application or injection of a corrosive, electrical shorting, shielding, or otherwise incapacitating material. An object can be electrically treated by the application of electric charge or current. An object can be magnetically treated by the generation of a magnetic signal, such as an electromagnetic pulse. Neutralizing can include triggering the self-destruction of the object by chemical, electrical or magnetic treatment, or by the generation of signals detectable by the object. Example signals that can be used to neutralize an object can include vibration signals, acoustic signals, electrical signals, magnetic signals, and optical signals.

Devices described herein can also be used to transport objects. Devices according to embodiments of the invention can be used to transport or move any material or device, such as an explosive charge, as a payload 180 (FIG. 1). Moving can include carrying a payload 180 to or from a vehicle, to or from an individual, or to or from a location. Transporting can be conducted in association with the movement of personnel and can occur before, after, or concurrently with the movement of personnel. Moving can be conducted by swimming, crawling, and digging. For example, gear can be transported ashore for military personnel going ashore. A second example is transporting supplies from an aquatic vehicle to military personnel operating on shore. A third example is carrying a device or information from personnel on shore to an aquatic vehicle. Devices according to embodiments of the invention can use various navigation techniques including dead reckoning, operator control, map following, contour following, waypoint following, direction following, geo-location determining, course changing, obstacle avoiding, obstacle overcoming, and fall-hazard avoiding techniques.

Devices according to embodiments of the present invention can be deployed from a ship, submarine, boat, aerial or terrestrial vehicle, or by a person. A plurality of uses can be combined sequentially or concurrently. For example, the device 100D can first gather information, such as to locate a buried object 1000 (as shown in FIG. 6) and identify it as a sea mine. Next, the device can neutralize the buried object 1000, for example, by uncovering and destroying the object 1000 by employing an explosive charge, such as the explosive charge shown in FIG. 3b.

In certain embodiments, it is desirable for the device to navigate in water and on land during its use. As illustrated in FIG. 6, the device 100D can dig a hole 46, for example, for the conduct of information gathering or for hiding or self-burying to reduce the probability of detection. In certain uses, swimming or crawling can be adaptive to information gathered during use. For example, swimming or crawling can be suspended if analysis of signals from transducers 160 (e.g., FIG. 1) indicate that threats of detection are unacceptably high during continued movement.

Devices according to embodiments of the invention can be used to transit a surf zone or swamp. For example, the device 100A of FIG. 2a can be operated with a dorsal surface 124 and/or the ventral surface 122 directed towards a substratum 40. The fins 140 can be used in self-righting maneuvers.

In certain embodiments, devices, such as the device 100 shown in FIG. 1, can use its transducers 160 to navigate in a desired direction or to a desired destination. The device 100 can gather information en route or at its destination. The device 100 can send or receive messages en route, at a deployment location, or at a destination location. Information, e.g., GPS readings, topographical profiles, waypoints and obstacles can be detected and analyzed and this information can be used to navigate the device 100. A destination of navigation can be pre-determined or the analysis of information gathered by the device 100 can be used to determine a destination. In certain embodiments, information can be stored in memory or communicated personnel or to other devices by various means, such as radio, optical, wireless, vibration, or acoustic communications methods.

In certain embodiments, navigation can be adaptive. For example, an unexpected obstacle or fall hazards detected by a transducer during operation can be overcome or avoided by adapting navigation plans or routes. Known information, e.g. topographic information stored in memory, can be used in adapting the navigation plan or route.

As shown in FIG. 6, the device 100D can be situated on the substratum 40 or in the water proximate the object 1000 for neutralization, either by autonomous navigation, by operator-directed navigation, or by placement by an operator or animal, such as a dolphin. When situated, the device 100D can approach the object 1000 by digging to uncover, drawing proximate to, or contacting the object 1000. Having achieved a desired proximity, the device 100D can trigger a neutralizing payload to neutralize the object 1000, which can be at least partly buried. The object 1000 can be an ordnance, mine, or other object. One example of a neutralizing payload is an explosive device 1400 (as shown in FIG. 3b), which is designed to detonate at a pre-determined time, at a predetermined proximity, after receiving a triggering message, and/or in response to signals detected by transducers. Digging or detonation can occur when the device is situated or at some time thereafter according to a pre-determined time, a communication, or detection of a signal.

Accordingly, devices according to embodiments of the invention can swim, crawl, and/or dig using a plurality of laterally disposed compliant fins or by creating water current to displace sediment using fins or other components. Fins can be operated in a variety of ways, including oscillation for swimming and material moving, quasi-statically orienting for steering or lift-generating, or rotating crawling and digging. Passive and active sensors can detect signals in the environment, a processor module can process detected signals and can run algorithms, a fin controller can control fin operation, and a communication module can sends or receive data. The device can be programmed with details for a particular mission, or provided with operational constraints for adaptive autonomous operation, or can be controlled by an operator via a communication link. Embodiments of the present invention can be used to gather intelligence for military operations, to neutralize an object, and/or to transport an object.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the neutralizing device includes an explosive device.

2. The device of claim 1 wherein the object is a mine.

3. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the neutralizing device is adapted to neutralize the object by electrically treating the object by applying an electric charge or current to the object.

4. The device of claim 3 wherein the object is a mine.

5. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the neutralizing device is adapted to neutralize the object by magnetically treating the object.

6. The device of claim 5 wherein the neutralizing device is adapted to neutralize the object by magnetically treating the object by generating an magnetic signal the magnetic signal including an electromagnetic pulse.

7. The device of claim 5 wherein the object is a mine.

8. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the neutralizing device is adapted to neutralize the object by triggering self-destruction of the object;
    wherein the neutralizing device is adapted to neutralize the object by triggering self-destruction of the object using generation of a signal detectable by the object; and
    wherein the signal detectable by the object includes at least one of a vibration signal, an acoustic signal, and an electromagnetic signal.

9. The device of claim 8 wherein the object is a mine.

10. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the neutralizing device is adapted to neutralize the object by triggering self-destruction of the object; and
    wherein the neutralizing device is adapted to neutralize the object by triggering self-destruction of the object using electromagnetic treatment.

11. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object; and
    a neutralizing unit mounted on the body and configured to neutralize the object;
    wherein the device is adapted to at least partly bury the neutralizing unit.

12. The device of claim 11 wherein:
    the sediment displacing unit is configured to fluidize the sediment; and
    the device is adapted to insert the neutralizing unit into the fluidized sediment.

13. The device of claim 11 wherein the neutralizing unit includes an explosive charge.

14. The device of claim 11 wherein the object is a mine.

15. A device for neutralizing an object at least partly covered with sediment in a fluid medium, the device comprising:
    a body;
    a sediment displacing unit mounted on the body, wherein the sediment displacing unit is configured to interact with the fluid medium and/or the sediment to displace the sediment covering the object, the sediment displacing unit including:
    a selectively extendable tube having a current outlet; and
    a pump configured to direct the fluid medium through the tube and away from the sediment displacing unit through the current outlet; and
    a neutralizing unit mounted on the body and configured to neutralize the object.

16. The device of claim 15 wherein the sediment displacing unit includes an extending mechanism operative to extend the tube.

17. The device of claim 15 wherein the sediment displacing unit is configured to fluidize the sediment.

18. The device of claim 15 wherein:
    the sediment displacing unit is configured to fluidize the sediment; and
    the device is adapted to insert the neutralizing unit into the fluidized sediment.

19. The device of claim 15 wherein the object is a mine.

* * * * *